United States Patent [19]

Detty

[11] E Re. 30,428

[45] Reissued Nov. 4, 1980

[54] MAGNETICALLY ACTUATED VISCOUS FLUID COUPLING

[75] Inventor: Rodney H. Detty, Marshall, Mich.

[73] Assignee: Eaton Corporation, Cleveland, Ohio

[21] Appl. No.: 20,282

[22] Filed: Mar. 14, 1979

Related U.S. Patent Documents

Reissue of:

[64] Patent No.: 4,056,178
Issued: Nov. 1, 1977
Appl. No.: 681,106
Filed: Apr. 28, 1976

[51] Int. Cl.[3] ..... F16D 35/00; F16D 43/25

[52] U.S. Cl. ..... 192/58 B; 192/82 T

[58] Field of Search ..... 192/58 B, 82 T

[56] References Cited

U.S. PATENT DOCUMENTS

| | | | |
|---|---|---|---|
| 2,723,738 | 11/1955 | Pesek | 192/82 T |
| 3,250,355 | 5/1966 | Weir | 192/58 B |
| 3,458,020 | 7/1969 | Lutz | 192/58 B |
| 3,568,647 | 3/1971 | Adams | 192/82 T X |
| 3,907,084 | 9/1975 | Hall | 192/58 B |

*Primary Examiner*—Allan D. Herrmann

*Attorney, Agent, or Firm*—R. J. McClosky; J. Yakimow

[57] ABSTRACT

A viscous fluid clutch employing a magnetic field selectively actuatable by a heat sensing device to operate a valve arm to seal an inlet passage fluidly communicating an operating chamber with a storage chamber. The clutch includes a clutch and a housing member rotatably disposed relative to one another. Each member has a shear surface. The surfaces define therebetween the operating chamber. The storage chamber is located in the housing member and is in fluid communication with the operating chamber via a discharge passage and the inlet passage. Pump means in the operating chamber displace fluid through the discharge passage from the operating chamber to the storage chamber. The inlet passage directs fluid from the storage to the operating chamber. A movable valve arm selectively seals the inlet passage. The valve arm is moved via a solenoid action in response to actuation of the magnetic field. Fluid is disposed within the clutch and is used, when located in the operating chamber, to rotate the housing members in response to rotation of the clutch member. When the fluid is displaced from the operating to the storage chamber, rotation of the housing member is reduced.

29 Claims, 1 Drawing Figure

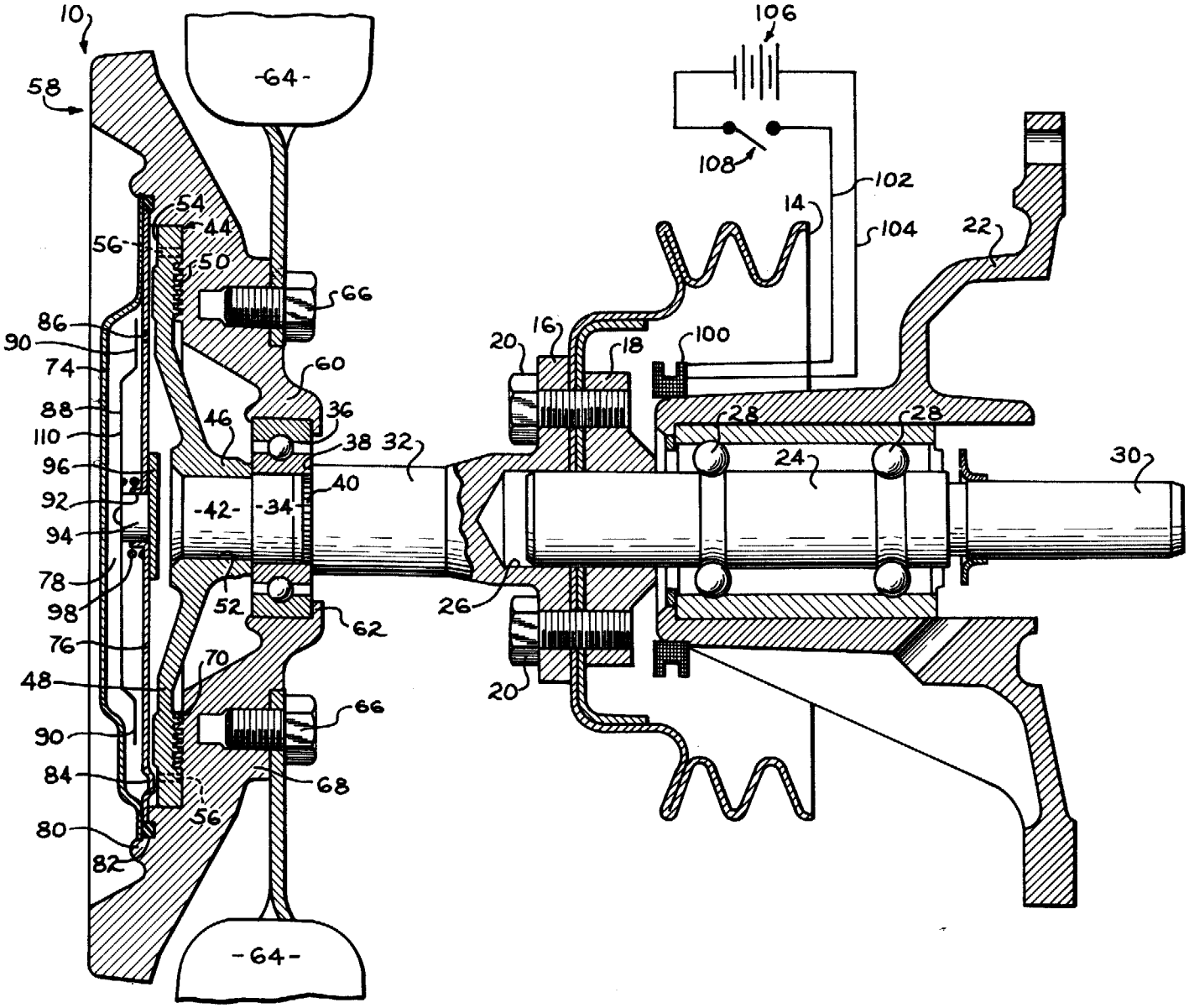
10
14
16
18
20
22
24
26
28
30
32
34
36
38
40
42
44
46
48
50
52
54
56
58
60
62
64
66
68
70
74
76
78
80
82
84
86
88
90
92
94
96
98
100
102
104
106
108
110

MAGNETICALLY ACTUATED VISCOUS FLUID COUPLING

Matter enclosed in heavy brackets [ ] appears in the original patent but forms no part of this reissue specification; matter printed in italics indicates the additions made by reissue.

This invention relates generally to viscous fluid clutches more particularly to viscous fluid clutches which are actuated by a magnetic field in response to temperature changes in a sensed medium.

Viscous fluid couplings have received wide acceptance in the automobile industry for controlling the amount of power needed to rotate the radiator cooling fan. The most common form of such viscous fluid couplings is the air temperature response type such as illustrated in U.S. Pat. No. 3,055,473. In certain applications, however, it has become desirable to sense directly the water temperature in the radiator rather than temperature of the air passing through the radiator. To date, many arrangements have been proposed to accomplish this result. These arrangements, however, have made use of wet or dry plate clutches that are generally pneumatically actuated or electromagnetic clutches that are electrically actuated. In each of these arrangements the advantages achieved through the use of viscous fluid have not been applied.

Accordingly, it is an object of the present invention to provide a viscous fluid coupling which may be simply and inexpensively constructed to be actuated by a mechanism that directly senses the water temperature of the radiator.

In accordance with a feature of the invention, a valve arm is provided in a viscous fluid coupling to be moved axially upon actuation of a magnetic field from a position in which the fluid storage chamber of the coupling is in direct fluid communication with the operating chamber via a fluid inlet opening to a position in which such communication is blocked. As is well known, the blocking of such fluid communication and the maintenance of a continuous flow of viscous fluid out of the operating chamber via a pumping opening results in the operating chamber being emptied of viscous fluid. Without fluid in the operating chamber the torque transfer between the clutch member of the coupling and the fan supporting housing is substantially eliminated. By unblocking the communication, viscous fluid is permitted to flow via the inlet opening into the operating chamber from the fluid storage chamber at a rate faster than the rate of flow of fluid via the pumping opening from the operating chamber to the fluid storage chamber. This allows for a transfer of torque from the clutch member to the fan supporting housing via the viscous fluid. The valve arm is moved in response to movement of an armature that is moved through a solenoid action upon energization of a coil.

The difference between a standard air actuated viscous fluid coupling such as shown in U.S. Pat. No. 3,055,473 and that of the disclosure has been kept to a minimum. Major changes within the coupling exist in the transposition of an axially movable armature for the rotationally movable thermo-responsive spring. The remaining portions of the viscous fluid coupling are basically the same. External of the coupling a coil and appropriate energization and switching means are provided.

FIG. 1 is a side elevational view, taken along the center-line of a viscous fluid coupling assembly according to the invention.

FIG. 1 illustrates a modulated viscous fluid coupling 10 and an accessory driving structure 12 comprising a pulley 14 connected to a shaft flange 16 and a companion hub plate 18 by bolts 20. A water pump housing 22 supported on the engine (not shown) has connected thereto a stub mounting shaft 24 which is mounted, by force fit, integral with hub plate 18. The unsupported end of stub shaft 24 extends into an annular opening 26 in the shaft flange 16. Bearings 28 are provided in a known manner to allow shaft 24 to rotate relative to housing 22. End 30 of shaft 24 is provided to drive a pump (not shown) for circulating water through the engine's cooling system. Pulley 14 is suitably driven by a belt from the engine to provide a driving input for both coupling 10 and the water pump.

Coupling 10 includes a driving shaft 32 integral with shaft flange 16. Shaft 32 is provided with a reduced intermediate portion 34 which functions as an inner race supporting means for ball bearing assembly 36. A shoulder 38 formed on shaft 32 restrains ball bearing 36 in one axial direction. A further shaft portion 40 is provided with surface serrations and is connected to a shaft portion 42.

A clutch member 44 is provided with a hub portion 46 and a plate portion 48 having a plurality of concentric annular coupling lands 50 formed on the back side thereof. Hub portion 46 is provided with a straight wall opening 52 which has an interference fit with shaft portion 42 so that clutch member 44 rotates with and is axially retained on shaft 32. Hub portion 46 is pressed onto the shaft until it abuts the inner race of bearing assembly 36 to axially confine the bearing assembly in the other direction of axial movement.

Clutch member 44 is provided with an annular recess 54 formed in a face of plate 48 on the side opposite annular lands 50. A pair of diametrically opposed axially directed holes 56 are disposed slightly radially outward of annular lands 50 and terminate in annular recess 54. Annular lands 50 terminate or alternatively are cut away in the form of a V notch to form a pair of diametrically opposed radially directed channels which are circumferentially coincident and in communication with holes 56. The structure defines a known fluid path commencing with the area adjacent annular lands 50, the radial channels, axially directed holes 56 and annular recess 54.

A fan support housing member 58 includes a hub 60 which is supported on the lateral surface of the outer race of ball bearing assembly 36 and is disposed in an interference fit therewith. A shoulder portion 62 reacts against an end surface of the outer race and limits movement of housing member 58 in one axial direction. A plurality of fan blades 64 are secured at the shank portion of the blades of bolts 66 radially intermediate body portion 68 of housing chamber 58.

Cooling fins (not shown) are formed on the outer surface of housing member 58 adjacent fan blades 64. The cooling fins are arranged to provide additional cooling area to dissipate heat which is generated in the coupling.

A plurality of concentric annular lands 70 are formed integral with housing 58. Lands 70 are positioned in an axial overlapping relationship with annular lands 50 to form a fluid operating chamber therebetween. Lands 50 and 70 are disposed in a position so that when oil or other viscous fluid means is disposed therebetween torque can be transmitted from one member to the other by fluid shear as disclosed in U.S. Pat. No. 2,948,268.

A cover plate 74 and a valve plate 76 cooperate to define a fluid storage chamber 78. Valve plate 76 is received in an annular notched recess provided in housing member 58 to laterally confine the valve plate. Cover plate 74 abuts the periphery of valve plate 76 along an annular surface to confine the valve plate 76 in both axial directions. The peripheral portion of cover plate 74 is fixed integrally with housing member 58 by an annular spun over portion 80. An O ring 82 disposed in an annular recess functions to retain the fluid within the operating assembly and to prevent interleakage of the fluid.

Valve plate 76 further includes a notched portion 84 which fits within recess 54 of clutch member 44 and extends radially across the opening of holes 56. As defined in U.S. Pat. No. 3,055,473 viscous fluid in the operating chamber is directed under centrifugal force through the radial channels to the axially directed holes 56 and into the annular recess 54. From there, notched portion 85 creates a high pressure area along its leading edge during rotation of clutch member 44. A hole (not shown) is provided in valve plate 76 to direct fluid out of the leading high pressure area into fluid storage chamber 78.

Rotation of shaft 32 results in rotation of clutch member 44. With viscous fluid in the operating chamber a viscous drive is created between clutch member 44 and housing member 58 to rotate the housing member with the clutch member. In the illustrated embodiment the majority of this drive exists in the land portion 50–70.

Valve plate 76 further includes a hole 86 radially located relative to the rotational axis of shaft 32 which communicates fluid from storage chamber 78 to the operating chamber. The hole is provided to introduce viscous fluid from the fluid storage chamber back into the operating chamber under the centrifugal force of rotation of housing 58. Appropriate holes may be provided in clutch member 44 to allow the viscous fluid to flow to both axial surfaces of the clutch member.

A valve arm 88 is provided to be moved in an axial direction between a first position as illustrated in FIG. 1 to a second position in which an outer portion 90 covers hole 86 and prevents fluid from flowing from fluid storage chamber 78 to the operating chamber. In the second position of valve arm 88, the centrifugal force of the fluid in the fluid storage chamber acts to aid the sealing of outer portion 90 of valve arm 88 against valve plate 76.

Valve plate 76 includes an axially aligned hole 92. An armature 94, made of a magnetic material such as steel, projects through valve plate hole 92 and includes a shoulder portion 96. The sliding fit of armature 94 in hole 92 along with shoulder portion 96 acts to form a semi-seal between fluid storage chamber 78 and the operating chamber. It should, however, be appreciated that during operation of coupling 10 the viscous fluid is located radially outwardly away from hole 92. A coil spring 98 encircles armature 94 and is interposed between valve arm 88 and valve plate 76. The spring acts to bias the armature to the left in FIG. 1. Shaft 32 is preferably flared out around clutch member 44 in order to aid in retention of the clutch member relative to the shaft. Shaft 32 is made of a magnetic material such as steel. The distance between the outer end portion of shaft 32 and shoulder 96 of armature 94 is maintained to a minimum for reasons to be hereinafter explained.

An electrical coil 100 is provided in encircling relationship to housing 22. Appropriate leads 102 and 104 are provided to coil 100 and to an electrical source of energy 106 to energize the coil. A known switch 108, schematically illustrated, is located in the radiator of the vehicle and used to actuate the coil when the temperature of the water within the radiator exceeds a predetermined value. Upon actuation of coil 100 a magnetic field is created through housing 22 and shaft 32. The field is of significant magnetic force to draw armature 94 to the right in FIG. 1 toward shaft 32. This drawing force is a solenoid type action. Upon movement of armature 94 toward shaft 32, outer portion 90 of valve arm 88 moves from its first position to its second position in which it covers hole 86 in valve plate 76.

Preferably, shoulder 96 does not contact shaft 32. Such contact would result in rubbing which is detrimental to clutch life. The contact is prevented by the prior contact of outer portion 90 with valve plate 76 in the disclosed embodiment.

Valve plate 76, clutch member 44 and housing 58 are made of non-magnetic materials such as aluminum. This will result in preventing a reduction in the strength of the magnetic field created by coil 100.

Coil 100 may also be located in other places such as in encircling relationship to shaft 32 or directly on shaft 32 with the electrical contacts being provided through slip rings.

The location of armature 94 is preferably located along the axis of rotation of shaft 32 to prevent the introduction of centrifugal force into its operation. For this reason, valve arm 88 is preferably balanced around the axis of shaft 32 by portion 110.

What is claimed is:

1. A viscous fluid clutch comprising a shaft made of magnetic material;

a first member secured to said shaft;

a second member rotatably disposed on said shaft relative to said first member;

shear surfaces disposed on said first and second members and forming an operating chamber therebetween;

a fluid storage chamber adjacent said operating chamber;

means for selectively inducing a magnetic field in said shaft;

valve means effecting selective communication between said storage chamber and said operating chamber and including a valve member, including an armature made of a magnetic material and located adjacent said shaft, movable in response to the induction of said magnetic field in said shaft from a first position to a second position, one of said positions providing communication between said storage chamber and said operating chamber and the other of said positions blocking such communication;

fluid means disposed within said storage chamber and being selectively displaced into said operating chamber when said valve member is in said one position to provide in said operating chamber a medium to transmit rotational movement from one of said members to the other of said members; and pump means in said operating chamber to displace said fluid means from said operating chamber to said storage chamber.

2. A clutch according to claim 1 wherein said members are radially disposed and rotatable about a common axis;

said chambers are axially disposed along said axis and are separated by a radially extending valve plate, said valve plate including an opening radially disposed from said axis of rotation;

said valve member is mounted for axial movement in said valve plate and includes a radially disposed valve arm that is movable from a position sealing said opening when said valve member is in said one position to a position spaced from said opening when said valve member is in said other position.

3. A clutch according to claim 2 further comprising means axially biasing said valve member away from said valve plate.

4. A clutch according to claim 2 wherein said valve plate and said members are made of a non-magnetic material.

5. A clutch according to claim 4 further comprising means biasing said armature axially away from said shaft; and means limiting the axial distance said armature is biased away from said shaft to a value which allows attraction of said armature to said shaft by said magnetic field.

6. A clutch according to claim 5 wherein said valve member is in one of said positions when said armature is spaced from said shaft and is in the other of said positions when said armature is drawn toward said shaft by said magnetic field.

7. A viscous fluid clutch according to claim 1 wherein said means for inducing a magnetic field includes a coil [spring] encircling said shaft.

8. A viscous fluid clutch comprising:

a shaft rotatable about an axis and made of a magnetic material;

a first radially disposed member secured to said shaft and made of a nonmagnetic material;

a second radially disposed member mounted for rotation on said shaft and made of a nonmagnetic material;

shear surfaces disposed on said first and second members and forming an operating chamber therebetween;

a fluid storage chamber axially spaced from said operating chamber and separated therefrom by a radially extending valve plate, said valve plate including an opening radially disposed from said axis;

means positioned proximate said shaft for selectively inducing a magnetic field in said shaft;

valve means effecting selective communication between said storage chamber and said operating chamber and including a valve member mounted for axial movement in said valve plate, said valve member including a radially disposed valve arm having an armature that is located adjacent said shaft and is made of a magnetic material, said valve arm being movable with said valve member from a first position sealing said radially disposed opening to a second position spaced from said radially disposed opening, said valve member being movable in response to induction of said magnetic field in said shaft from said first position to said second position;

fluid means disposed within said storage chamber and being selectively displaced into said operating chamber when said valve member is in said second position to provide in said operating chamber a medium to transmit rotational movement from one of said members to the other of said members; and pump means in said operating chamber to displace said fluid means from said operating chamber to said storage chamber.

9. A viscous fluid clutch according to claim 8 wherein said means for inducing a magnetic field includes a coil encircling said shaft.

10. A viscous fluid clutch according to claim 8 further comprising means biasing said armature axially away from said valve plate.

11. A viscous fluid clutch according to claim 10 wherein said armature is concentric with said axis.

12. A viscous fluid clutch according to claim 8 wherein said valve plate includes an opening concentric with said axis and said armature is slidably positioned within said concentric opening.

13. A viscous fluid clutch comprising:

a shaft rotatable about an axis and made of a magnetic material;

a generally radially extending clutch member secured to said shaft for rotation therewith;

a generally radially extending housing member encircling said clutch member;

bearing means supporting said housing member on said shaft for rotation relative to said shaft;

shear surfaces disposed on said members;

a valve plate secured to said housing member and together with said housing member defining an operating chamber surrounding said clutch member;

a cover plate secured to said housing member and together with said valve plate defining a fluid storage chamber; a hole concentric with said axis in said valve plate; an armature located within said hole and axially movable therein, said armature having a position that is adjacent said shaft and is made of a magnetic material;

another hole located in said valve plate and disposed radially from said axis;

a valve arm secured to said armature for axial movement therewith and having an outer portion aligned with said other hole and being of a size to cover said other hole, said armature and, accordingly, said valve arm having a first position in which said outer portion covers said other hole and a second position in which said outer portion is spaced from said other hole, said armature being spaced from said shaft in at least one of said positions; means biasing said armature axially relative to said valve plate toward one of said positions;

fluid disposed within said fluid storage chamber and being selectively displaced into said operating chamber through said other hole when said armature is in said second position to provide in said operating chamber a medium to transmit rotational movement from said clutch member to said housing member;

pump means in said operating chamber to displace said fluid from said operating chamber to said fluid storage chamber; and electrical coil means encircling said shaft for selectively inducing a magnetic field in said shaft to force said armature toward said other position.

14. A viscous fluid clutch according to claim 13 wherein said valve plate and said members are made of a nonmagnetic material.

15. A viscous fluid clutch according to claim 14 wherein said biasing means is a coil spring having one end contacting said valve plate and the other end contacting said valve arm.

16. A viscous fluid clutch according to claim 15 wherein said armature includes an enlarged shoulder portion encircling said concentric hole, said shoulder portion being in contact with said valve plate when said armature is in one of said positions.

17. A viscous fluid clutch according to claim 15 wherein said valve arm is located within said storage chamber.

18. A viscous fluid clutch comprising:

a shaft rotatable about an axis and made of a magnetic material;

a generally radially extending clutch member secured to said shaft for rotation therewith and made of a nonmagnetic material;

a generally radially extending housing member encircling said clutch member and made of a nonmagnetic material; bearing means supporting said housing member on said shaft for rotation relative to said shaft;

shear surfaces disposed on said members;

a valve plate secured to said housing member and together with said housing member defining an operating chamber surrounding said clutch member, said valve plate being made of a nonmagnetic material;

a cover plate secured to said housing member and together with said valve plate defining a fluid storage chamber; a hole concentric with said axis in said valve plate; an armature located within said hole and axially movable therein, said armature having a shoulder portion that is adjacent said shaft and is made of a magnetic material, said shoulder portion being located in said operating chamber and being of a size to cover said concentric hole; another hole located in said valve plate and disposed radially from said axis;

a valve arm within said storage chamber secured to said armature for axial movement therewith and having an outer portion aligned with said other hole and being of a size to cover said other hole, said armature and, accordingly, said valve arm having a first position in which said outer portion covers said other hole and a second position in which said outer portion is spaced from said other hole and said shoulder portion contacts said valve plate and covers said concentric hole, said armature being spaced from said shaft in both of said positions;

means biasing said armature axially relative to said valve plate toward said second position;

fluid disposed within said fluid storage chamber and being selectively displaced into said operating chamber through said other hole when said armature is in said second position to provide in said operating chamber a medium to transmit rotational movement from said clutch member to said housing member;

pump means in said operating chamber to displace said fluid from said operating chamber to said fluid storage chamber; and electrical coil means encircling said shaft for selectively inducing a magnetic field in said shaft to force said armature toward said first position.

*19. A viscous fluid clutch comprising:*

*a first member rotatable about an axis;*

*a second member rotatably disposed on said axis relative to said first member;*

*shear surfaces disposed on said first and second members and forming an operating chamber therebetween;*

*a fluid storage chamber adjacent said operating chamber;*

*a shaft made of a magnetic material and mounted on one of said members for rotation about said axis;*

*means for selectively inducing a magnetic field in said shaft;*

*valve means effecting selective communication between said storage chamber and said operating chamber and including a valve member, including an armature made of a magnetic material and located adjacent said shaft, movable in response to the induction of said magnetic field in said shaft from a first position to a second position, one of said positions providing communication between said storage chamber and said operating chamber and the other of said positions blocking such communication;*

*fluid means disposed within said storage chamber and being selectively displaced into said operating chamber when said valve member is in said one position to provide in said operating chamber a medium to transmit rotational movement from one of said members to the other of said members; and*

*pump means in said operating chamber to displace said fluid means from said operating chamber to said storage chamber.*

*20. A viscous fluid clutch comprising:*

*a generally radially extending clutch member mounted for rotation about an axis;*

*a generally radially extending housing member encircling said clutch member;*

*bearing means supporting said housing member for rotation relative to said clutch member about said axis;*

*shear surfaces disposed on said members;*

*a valve plate secured to said housing member and together with said housing member defining an operating chamber surrounding said clutch member;*

*a cover plate secured to said housing member and together with said valve plate defining a fluid storage chamber;*

*a shaft rotatable about said axis, mounted on one of said members, and made of a magnetic material;*

*a hole concentric with said axis in said valve plate;*

*an armature located within said hole and axially movable therein, said armature having a position that is adjacent said shaft and is made of a magnetic material;*

*another hole located in said valve plate and disposed radially from said axis;*

*a valve arm secured to said armature for axial movement therewith and having an outer portion aligned with said other hole and being of a size to cover said other hole, said armature and, accordingly, said valve arm having a first position in which said outer portion covers said other hole and a second portion in which said outer portion is spaced from said other hole, said armature being spaced from said shaft in at least one of said positions;*

*means biasing said armature axially relative to said valve plate toward one of said positions;*

*fluid disposed within said fluid storage chamber and being selectively displaced into said operating chamber through said other hole when said armature is in*

*said second position to provide in said operating chamber a medium to transmit rotational movement from said clutch member to said housing member;*

*pump means in said operating chamber to displace said fluid from said operating chamber to said fluid storage chamber; and*

*electrical coil means encircling said shaft for selectively inducing a magnetic field in said shaft to force said armature toward said other position.*

*21. A viscous fluid clutch according to claim 20 wherein said valve plate and said members are made of a nonmagnetic material.*

*22. A viscous fluid clutch according to claim 21 wherein said biasing means is a coil spring having one end contacting said valve plate and the other end contacting said valve arm.*

*23. A viscous fluid clutch according to claim 22 wherein said armature includes an enlarged shoulder portion encircling said concentric hole, said shoulder portion being in contact with said valve plate when said armature is in one of said positions.*

*24. A viscous fluid clutch according to claim 23 wherein said valve arm is located within said storage chamber.*

*25. A viscous fluid clutch comprising:*

*a first member rotatable about an axis;*

*a second member rotatably disposed on said axis relative to said first member;*

*shear surfaces disposed on said first and second members and forming an operating chamber therebetween;*

*a fluid storage chamber adjacent said operating chamber;*

*a shaft made of a magnetic material and situated on said axis;*

*a coil for selectively inducing a magnetic field in said shaft;*

*valve means effecting selective communication between said storage chamber and said operation chamber and including a valve member, including an armature made of a magnetic material, located at least in part adjacent said shaft, and movable in response to the induction of said magnetic field in said shaft from a first position to a second position, one of said positions providing fluid communication between said storage chamber and said operating chamber and the other of said positions blocking such fluid communication;*

*fluid means disposed within said storage chamber and being selectively displaced into said operating chamber when said valve member is in said one position to provide in said operating chamber a medium to transmit rotational movement from one of said members to the other of said members; and*

*pump means in said operating chamber to displace said fluid means from said operating chamber to said storage chamber.*

*26. A viscous fluid clutch comprising:*

*a first member rotatable about an axis;*

*a second member rotatably disposed on said axis relative to said first member;*

*shear surfaces disposed on said first and second members and forming an operating chamber therebetween;*

*a fluid storage chamber adjacent said operating chamber;*

*an annular inductive coil defining a generally cylindrical cavity on said axis;*

*a member made of a magnetic material, situated on said axis, and located at least in part in said cavity;*

*electrical means for passing an electric current through said coil to selectively induce a magnetic field in said member made of a magnetic material;*

*valve means effecting selective communication between said storage chamber and said operating chamber and including a valve member associated with said member made of a magnetic material and movable in response to the induction of said magnetic field from a first position to a second position, one of said positions providing fluid communication between said storage chamber and said operating chamber and the other of said positions blocking such fluid communication;*

*fluid means disposed within said storage chamber and being selectively displaced into said operating chamber when said valve member is in said one position to provide in said operating chamber a medium to transmit rotational movement from one of said members to the other of said members; and*

*pump means in said operating chamber to displace said fluid means from said operating chamber to said storage chamber.*

*27. A viscous fluid clutch comprising:*

*a generally radially extending clutch member mounted for rotation about an axis;*

*a generally radially extending housing member encircling said clutch member;*

*bearing means supporting said housing member for rotation relative to said clutch member about said axis;*

*shear surfaces disposed on said members;*

*a valve plate secured to said housing member and together with said housing member defining an operating chamber surrounding said clutch member;*

*a cover plate secured to said housing member and together with said valve plate defining a fluid storage chamber;*

*a member situated on said axis and made of a magnetic material;*

*a hole located in said valve plate and disposed radially from said axis;*

*a valve arm having an armature portion that is made of a magnetic material, and axially movable, and that has an outer portion aligned with said hole and being of a size to cover said hole, said valve arm and said armature portion having a first position in which said outer portion covers said hole and a second portion in which said outer portion is spaced from said hole, said armature portion being spaced from said magnetic member in at least one of said positions;*

*means biasing said valve arm axially relative to said valve plate toward one of said positions;*

*fluid disposed within said fluid storage chamber and being selectively displaced into said operating chamber through said hole when said valve arm is in said second position to provide in said operating chamber a medium to transmit rotational movement from said clutch member to said housing member;*

*pump means in said operating chamber to displace said fluid from said operating chamber; and*

*electrical coil means encircling said magnetic member for selectively inducing a magnetic field in said magnetic member to force said armature portion toward said other position.*

*28. A viscous fluid clutch according to claim 27 wherein said valve arm is located within said storage chamber.*

*29. A viscous fluid clutch according to claim 27 further comprising another hole in said valve plate and located proximate said axis to maintain said chambers in said open communication with one another.*

* * * * *